(12) United States Patent
Krumbholz

(10) Patent No.: US 7,808,508 B2
(45) Date of Patent: Oct. 5, 2010

(54) DENTAL COLOR SYSTEM AND METHOD TO PRODUCE DENTAL PROSTHESIS COLORS

(75) Inventor: Klaus Krumbholz, Waldbuttelbrunn (DE)

(73) Assignee: Degudent GmbH, Hanau (DE)

( * ) Notice: Subject to any disclaimer, the term of this patent is extended or adjusted under 35 U.S.C. 154(b) by 595 days.

(21) Appl. No.: 11/776,834

(22) Filed: Jul. 12, 2007

(65) Prior Publication Data
US 2008/0020341 A1    Jan. 24, 2008

(30) Foreign Application Priority Data

Jul. 21, 2006   (DE) ................. 10 2006 034 329
Oct. 21, 2006   (DE) ................. 10 2006 049 743

(51) Int. Cl.
| | |
|---|---|
| G06T 17/00 | (2006.01) |
| G06T 11/20 | (2006.01) |
| G09G 5/00 | (2006.01) |
| G09G 5/02 | (2006.01) |
| G06K 9/00 | (2006.01) |
| A61C 3/00 | (2006.01) |
| A61C 13/00 | (2006.01) |

(52) U.S. Cl. ............... 345/589; 345/428; 345/591; 345/593; 345/443; 358/518; 382/162; 382/167; 382/165; 433/2; 433/203; 433/26

(58) Field of Classification Search ............... 345/426, 345/428, 589–591, 593, 597, 600, 604, 549, 345/443; 348/277–280; 358/515–518; 382/162, 382/165, 167, 274; 433/1–2, 203, 26
See application file for complete search history.

(56) References Cited

U.S. PATENT DOCUMENTS 6,030,209 A    2/2000 Panzera et al.
6,271,920 B1 *  8/2001  Macfarlane et al. ......... 356/402
6,755,646 B2 *  6/2004  Zun .............................. 433/26
2003/0124481 A1 *  7/2003  Zun .............................. 433/26

(Continued)

FOREIGN PATENT DOCUMENTS

EP    0147232    7/1985

(Continued)

*Primary Examiner*—Wesner Sajous
(74) *Attorney, Agent, or Firm*—Dennison, Schultz & MacDonald

(57) ABSTRACT

A dental color system having primary and mixed colors with assigned coordinates in the CIElab color space, in which the colors of natural teeth are essentially located on coordinates within an ellipsoid-shaped space, which is assigned a longitudinal axis. In order for the color system to consist of a small number of primary and mixed colors and to allow an optimum color adaptation to the natural teeth surrounding the dental prosthesis, it is proposed that the primary colors consist of first primary colors and at least one group of second primary colors, that the coordinates of the first primary colors be positioned on the longitudinal axis of the ellipsoid-shaped space or on a base line extending from light to dark in the CIElab space, that the coordinates of at least one group of second primary colors be positioned in a plane that perpendicularly intersects the longitudinal axis or base line, and that the coordinates of mixed colors be intersection points of first and second straight lines, whereby at least one first straight line extends parallel to the longitudinal axis or base line and the respective second straight line is a connection between the coordinates of the first primary color and the second primary color.

21 Claims, 6 Drawing Sheets

U.S. PATENT DOCUMENTS

| | | | |
|---|---|---|---|
| 2004/0078299 A1* | 4/2004 | Down-Logan et al. | 705/27 |
| 2004/0224278 A1* | 11/2004 | Zun | 433/26 |
| 2005/0084819 A1* | 4/2005 | Sims et al. | 433/173 |
| 2008/0274440 A1* | 11/2008 | Smith et al. | 433/174 |

FOREIGN PATENT DOCUMENTS

| | | |
|---|---|---|
| EP | 0591958 | 4/1994 |
| EP | 1068841 | 1/2001 |

* cited by examiner

DENTAL COLOR SYSTEM AND METHOD TO PRODUCE DENTAL PROSTHESIS COLORS

BACKGROUND OF THE INVENTION

The present invention relates to a dental color system that comprises primary colors and mixed colors with assigned coordinates in the CIElab color space, in which the coordinates of the colors of natural teeth are located essentially within an ellipsoid-shaped space, which is assigned a longitudinal axis or a baseline extending from light to dark in the CIElab space.

The invention further relates to a method for producing dental prosthesis colors for a dental prosthesis surrounded by a remaining set of teeth utilizing primary and/or mixed colors with coordinates in the CIElab color space, in which the colors of natural teeth are essentially located on coordinates within an ellipsoid-shaped space, which is assigned a longitudinal axis or a base line extending from light to dark in the CIElab space, whereby the color of the remaining teeth is determined in coordinates in the CIElab color space.

Dental restoration in the form of for example crowns or bridges are usually manufactured of a supporting skeleton material, consisting of a metal, an alloy, or high-strength ceramics, which is faced with a tooth-colored plastic and/or ceramic material. To satisfy aesthetic requirements, the color of the restoration must be matched to the color of the natural remaining teeth. For the purpose of ensuring an approximate match, facing materials are offered in several tooth colors. Tooth-shaped samples are produced for the available tooth colors and are combined into so-called color indicators. These indicators are used to select the facing material appropriate for the given case. The number of available tooth colors is limited to ensure manageability of the selection sample and to keep stock keeping costs low. Thus, indicators from leading manufacturers contain 16 to 26 colors. However, this limitation has the disadvantage that in many cases the tooth color of the dental restoration is not matched to the color of the remaining teeth to the necessary degree.

To avoid this disadvantage, one ideally would have available a color system that covers the color space of natural teeth to an extent that is tailored to the color-distinguishing ability of a normal-sighted person. However, in this case the number of colors would be so great that it would no longer be possible to provide a practical selection sample. Moreover, a color indicator that depicts all colors would no longer be manageable.

Already in practical use is a VITAPAN 3D master color system, which places its focus on the most common tooth colors. The available dental prosthesis colors are selectively arranged in planes, which in the CIElab color space are situated in an ellipsoid-shaped space taking the shape of an upright banana, which comprises the usually occurring natural tooth colors. To determine a color for the prosthesis, one determines in a first step the brightness level and in a second step the color depth. In a subsequent third step the color hue is determined. Samples of correspondingly colored teeth are available for this.

Dental color indicators with a multitude of sets of color templates are known from EP-A-0 147 232 and EP-B-0 591 958. Here, the coordinates of color samples of each respective set are located on a plane of constant lightness, which extends perpendicular relative to the L axis of the CIElab coordinate system. The first primary colors of the parallel extending plane(s) are situated on a common straight line, which extends at an offset relative to the L axis. Every color template originates from a mount embodied in fan-like fashion.

U.S. Pat. No. 6,030,209 specifies the use of a spectrophotometer to determine and select the color hue of a dental prosthesis. The teeth surrounding the dental prosthesis to be manufactured are illuminated with varying illumination and the reflected light is analyzed, correcting for ambient light. Subsequently, several coloring substances are selected from the available ones and are mixed in order to obtain the desired shade of color for the dental prosthesis.

EP-B-1 068 841 concerns a dental color system with a multitude of different color samples that are regularly spaced with regard to lightness, color saturation, and hue on at least one triangular column in the CILAB color space.

SUMMARY OF THE INVENTION

It is the objective of the present invention to provide a color system for dental prostheses with colors situated on coordinates within the ellipsoid-shaped space in the CIElab color space that represents the colors of natural teeth, whereby said system consists of a smaller number of primary and mixed colors and allows optimum color matching to the natural teeth surrounding the dental prosthesis.

This objective is met substantially by a dental color system of the previously described type, in which the primary colors consist of first primary colors and at least one group of second primary colors, the coordinates of the first primary colors are situated on the longitudinal axis or base line of the ellipsoid-shaped space, the coordinates of at least one group of second primary colors are situated on a plane that perpendicularly intersects the longitudinal axis or the base line, and the coordinates of the mixed colors are intersection points of first and second straight lines, whereby at least one first straight line extends parallel to the longitudinal axis or base line and the respective second straight line is a connection between the coordinates of one of the first primary colors and one of the second primary colors.

To provide a sufficiently large range of dental prosthesis colors, it is intended that the coordinates of the at least one group of second primary colors be situated outside of the ellipsoid-shaped space and that the coordinates of the second primary colors be situated in at least two planes, which extend at some distance from each other and perpendicularly intersect the longitudinal axis or the base line.

Independent of this, it is intended that the second primary colors that are on a common plane are situated on a circle that has the longitudinal axis or base line as its center or that the second primary colors that are on a common plane are situated on a line, which equidistantly surrounds the intersection between the plane and the envelope of the ellipsoid-shaped space.

To increase the number of dental prosthesis colors to facilitate an even better matching to the colors of the remaining teeth, it is intended that one second straight line intersects at least two first straight lines. In this, the two first straight lines should subdivide the first straight line between the coordinates of the first and the second primary colors with equal proportions.

In particular, it is intended that each second straight line be subdivided with equal proportions by a respective first straight line between the coordinates of the first and the second primary color, whereby the at least one first straight line subdivides the second straight line between the coordinates of the first and the second primary colors with a proportion of 1:n, with n=1, 2, or 3, or the at least two first straight lines subdivide the second straight line between the coordinates of the first and the second primary color with a proportion of 1:n with n=2 or 3.

The number of first primary colors that are situated on the longitudinal axis or base line of the ellipsoid-shaped space should be at least four, but preferably be between eight and twelve. Here it is intended that the lightest and/or darkest first primary colors be situated outside of the ellipsoid-shaped space representing the standard natural tooth colors. Independent of this, the invention proposes that the relative spacing between consecutive first primary colors should be constant. The same should apply for the second primary colors within the plane, whereby their number per plane is at least four but preferably at least six.

Put another way, the distance between the first or second primary colors relative to each other is constant.

A method for producing dental prosthesis colors for a dental prosthesis surrounded by a remaining set of teeth utilizing primary and/or mixed colors, which have coordinates in the CIElab color space, in which dental colors of natural teeth are situated essentially on coordinates in an ellipsoid-shaped space, which is assigned a longitudinal axis or a base line extending from light to dark in the CIElab space, whereby the color of the remaining teeth is determined in coordinates of the CIElab space, is characterized by the following procedure steps:

Defining first primary colors with coordinates on the longitudinal axis or base line of the ellipsoid-shaped space, Defining second primary colors with coordinates in at least one plane that perpendicularly intersects the longitudinal axis or the base line, Defining mixed colors with coordinates that are on intersection points of first straight lines extending parallel to the longitudinal axis and connecting straight lines between the first and second primary colors, and Selecting the coordinates of one of the primary or mixed colors that are closest to the coordinates of the remaining teeth color as the dental prosthesis color.

For this the second primary colors should be defined so that their coordinates are situated outside of the ellipsoid-shaped space. In addition, the mixed colors preferably are specified so that their coordinates are situated on at least two planes, which are parallel to each other and perpendicularly intersect the longitudinal axis or base line.

The color of the remaining teeth is measured by means of a measuring instrument, whereby the measuring instrument sends data corresponding to the CIElab coordinates of the color to a computer, where the data corresponding to the CIElab coordinates of the primary and mixed colors is stored and is compared to the color data of the remaining teeth, whereupon this comparison forms the basis for information being generated regarding the mixing ratio of one first and one second primary color or the use of one first primary color as dental prosthesis color. In this it is also possible to use a second primary color as dental prosthesis color as long as the second primary color is located within the ellipsoid-shaped space or on its boundary.

According to the invention, the color sampling from the patient and the inspection of the completed dental restoration is not carried out using a color indicator, but rather by means of a measuring instrument, which in a computer has available stored data of the colors achievable from the substance assortment offered on the basis of the available primary and mixed colors. The computer compares the acquired color values to the stored data and recommends a correspondingly coded color for the restoration. The substance assortment, i.e. the number of first and second primary colors, is limited to a few colors, from which one produces the desired dental color by mixing with simple mixing ratios. The CIElab system is used in the representation of the colors; however the invention's teachings are also applicable to other systems. The L*, a*, b* values computed from the standard color values acquired in the measurement provide information about lightness (L*), red value (a*), yellow value (b*), and the values for color depth (c*) and color hue (h*) derived therefrom. Natural tooth colors can be represented in the CIElab space by the ellipsoid-shaped body with a longitudinal or center line passing through this space from light to dark. The proposed system is based on a series of at least eight and at most twelve first primary colors, which are equally spaced along the longitudinal or middle axis. The first primary colors can also be referred to as base substances. The lightest or darkest base substances or rather their coordinates are situated outside of the ellipsoid-shaped space, i.e. beyond the darkest possible tooth color and—allowing for the artificial lightening usually carried out—lightest possible color, to optimize the number and position of the colors to be mixed from them.

Also provided—to be mixed with the base substances to create mixed colors—are the second primary colors—also referred to as modifier substances—which are positioned in the color space as follows. In the center of the ellipsoid of natural tooth colors, one can envision a circular or possibly elliptical plane, which is perpendicularly penetrated in its center at by the line on which the base substances are situated. Furthermore, this plane should project slightly beyond its intersection with the ellipsoid of natural tooth colors. The modifier substances are arranged equally spaced on the perimeter of this plane. In order to be able to obtain adequate color density, the plane should contain six modifier substances, which are positioned on the circle or ellipse, equally spaced as already mentioned. Mixing each of these six modifier substances with each of the base substances in a 1:1 ratio yields for 8 base substances: 8×6=48 mixed colors on the basis of a total of fourteen base and modifier substances. Including the useable six base colors inside the ellipsoid-shaped space, one has available 54 mixed colors to use as tooth colors. Mixing the base and modifier substances in a 1:1 ratio yields mixed colors that are positioned in the CIElab space on straight lines extending parallel to the center axis or the line on which the base substances are situated. Consequently, the number of modifier substances determines the minimum number of straight lines, on which the mixed colors are situated.

Mixing base substances and modifier substances with two different proportions, e.g. two parts modifier substance to one part base substance, results in two mixing straight lines extending between each modifier substance and the longitudinal or center axis of the ellipsoid-shaped space, whereby the distances between the longitudinal axis or the longitudinal or center axis containing the base substances and the first mixing straight line and from the first mixing straight line to the second mixing straight line are equal. This configuration results in a space orderly filled with 2×8×6+6=102 tooth colors.

Of course it is also possible to arrange the modifier substances on not only one lightness plane, but rather on two or more, which—even though it increases the number of substances to be made available—results in a more uniform distribution of mixed colors in the CIElab color space of natural tooth colors.

If the first primary colors, i.e. the base substances, are situated on the longitudinal or center axis of the ellipsoid-shaped space, then they could also be situated on a different base line, which extends from light to dark in the CIElab space and should extend adjacent to the longitudinal or center axis.

BRIEF DESCRIPTION OF THE DRAWINGS

Further details, advantages, and features of the invention are not only found in the claims, the features contained therein—on their own and/or in combination—, but also in the following description of preferred embodiment examples illustrated in the figures.

DESCRIPTION OF THE PREFERRED EMBODIMENTS

The pictorial presentation will serve to illustrate the invention's instructions for determining mixed colors, in order to determine and produce a dental prosthesis color that is matched to the color of the remaining set of teeth surrounding the dental prosthesis, without letting the number of mixed colors to be made available become unmanageable or confusing.

Figure 1:
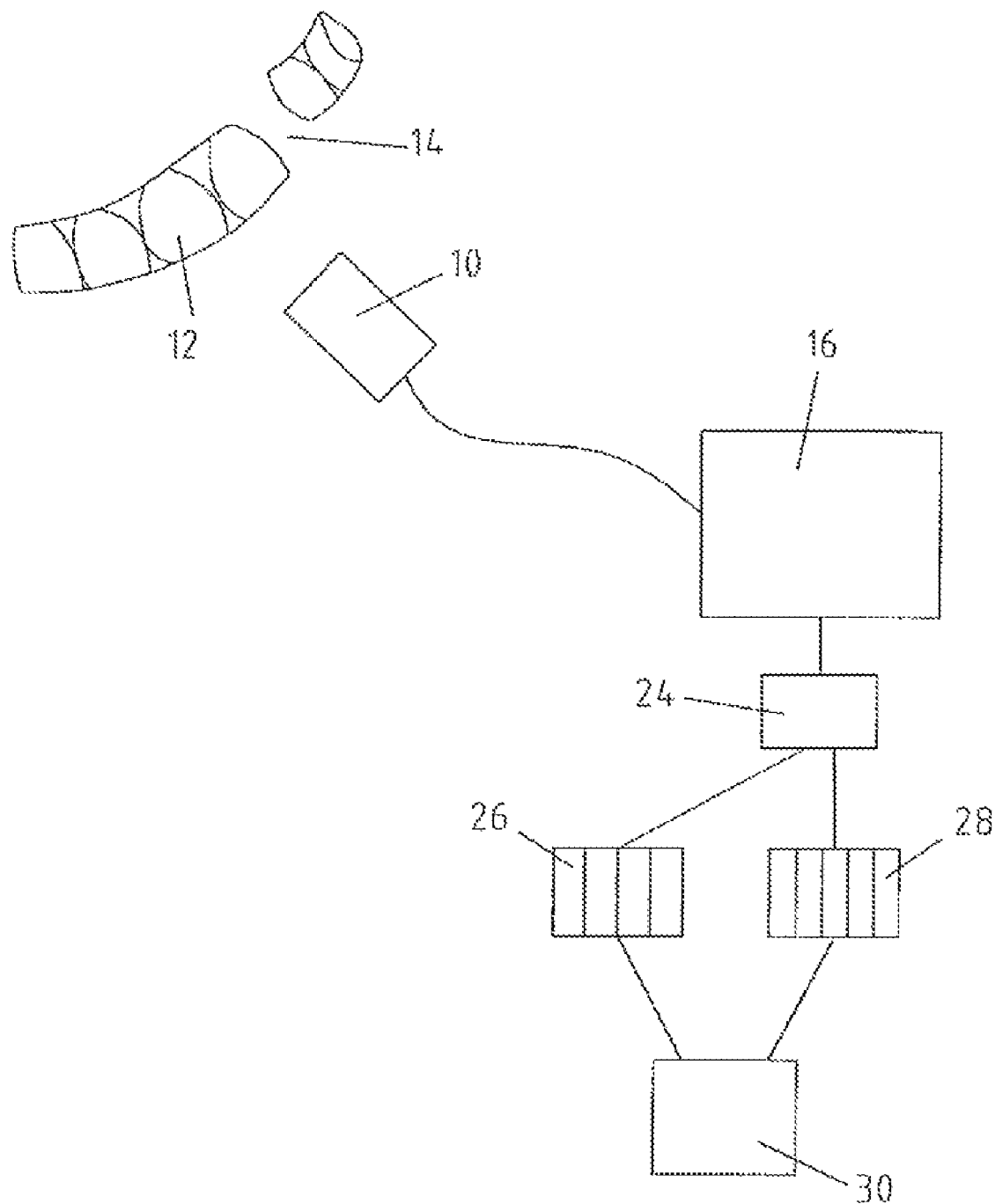
FIG. 1 shows a schematic diagram of an arrangement for measuring the colors of a remaining set of teeth.
Figure 4:
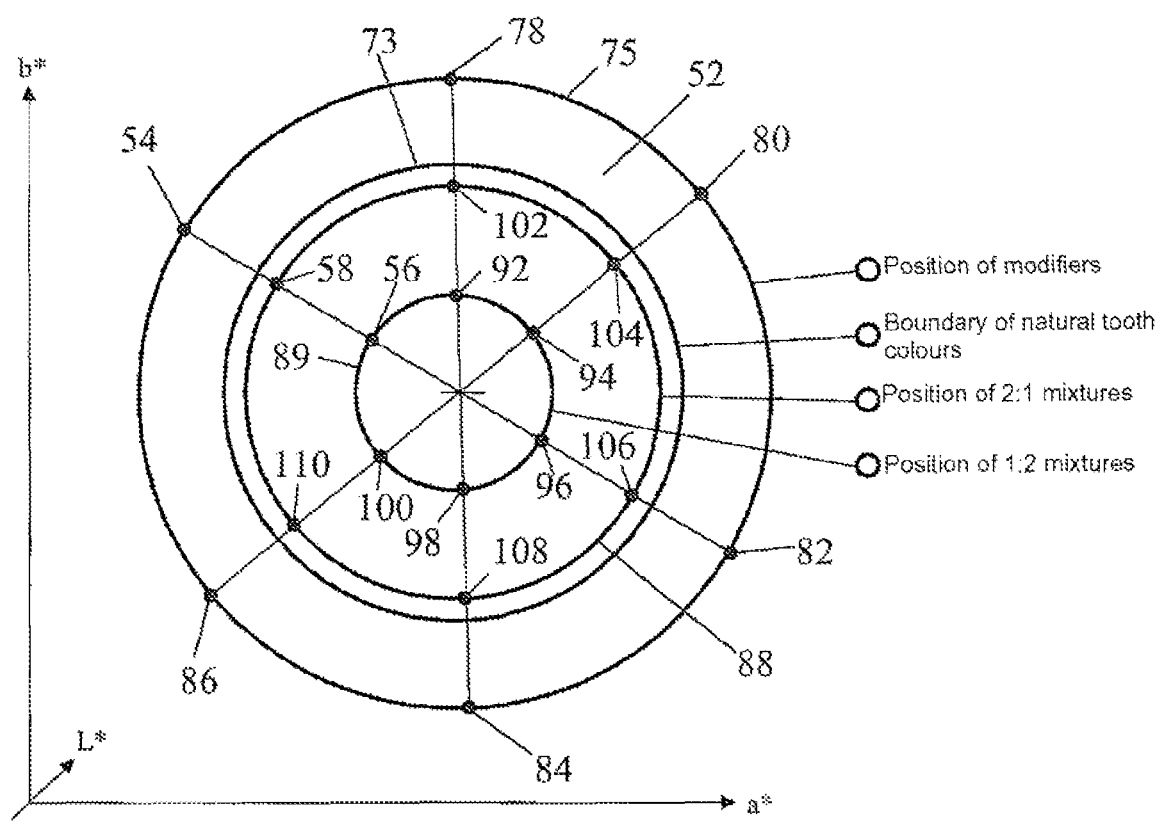
FIG. 4 shows a cross section—associated with the diagram in FIG. 3—of the space representing the natural teeth in the CIElab color space.
Figure 5:
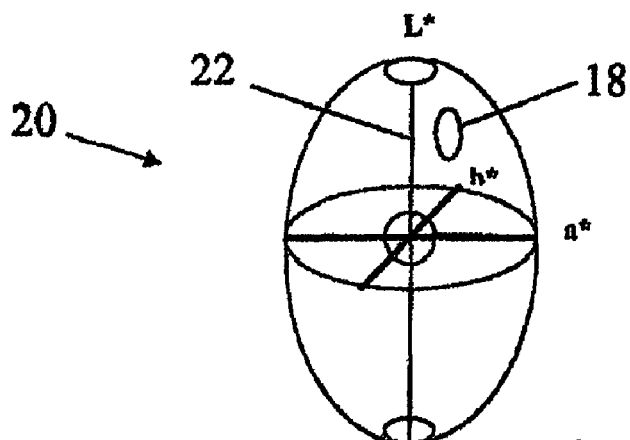
FIG. 5 shows a schematic diagram of the CIElab color space.

As illustrated in FIG. 1, one at first employs—for example—a handheld spectrophotometer 10 to acquire the color of a remaining set of teeth 12, which exhibits a gap 14, into which a dental prosthesis is to be inserted. The handheld spectrophotometer is connected to a computer 16, in which the usually occurring natural tooth colors are stored in CIElab coordinates. The colors of natural teeth are located in an ellipsoid-shaped space 18 of the CIElab color space 20, which is purely schematically illustrated in FIG. 5. The CIElab color space is defined by the coordinate axes L*, a*, and b*. As an alternative to the a* and b* values it is possible to specify the hue h and the chroma C* (relative color saturation), as is shown in FIGS. 4 and 5.

Figure 2:
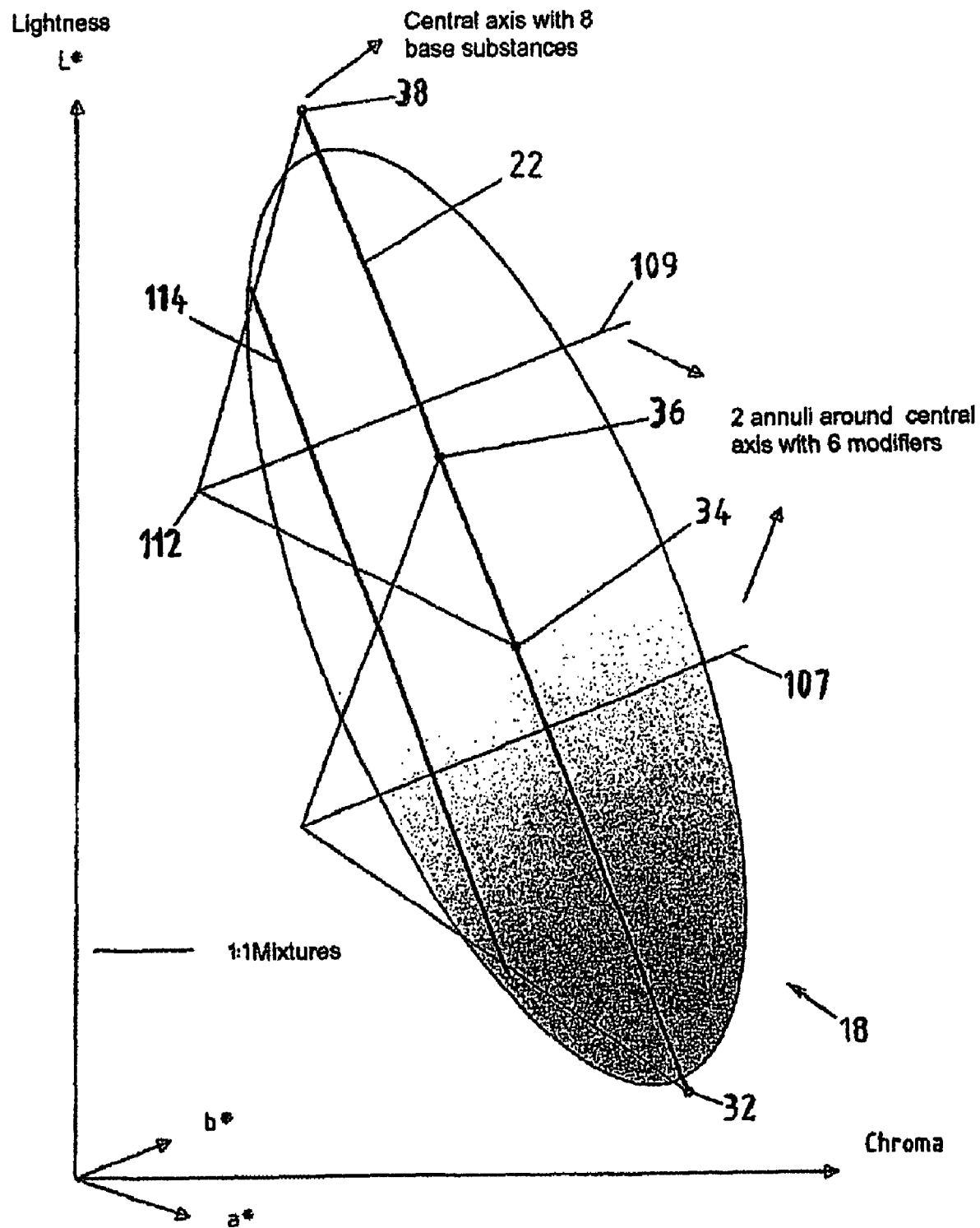
FIG. 2 shows a longitudinal section of the space that represents the natural teeth in the CIElab color space.
Figure 3:
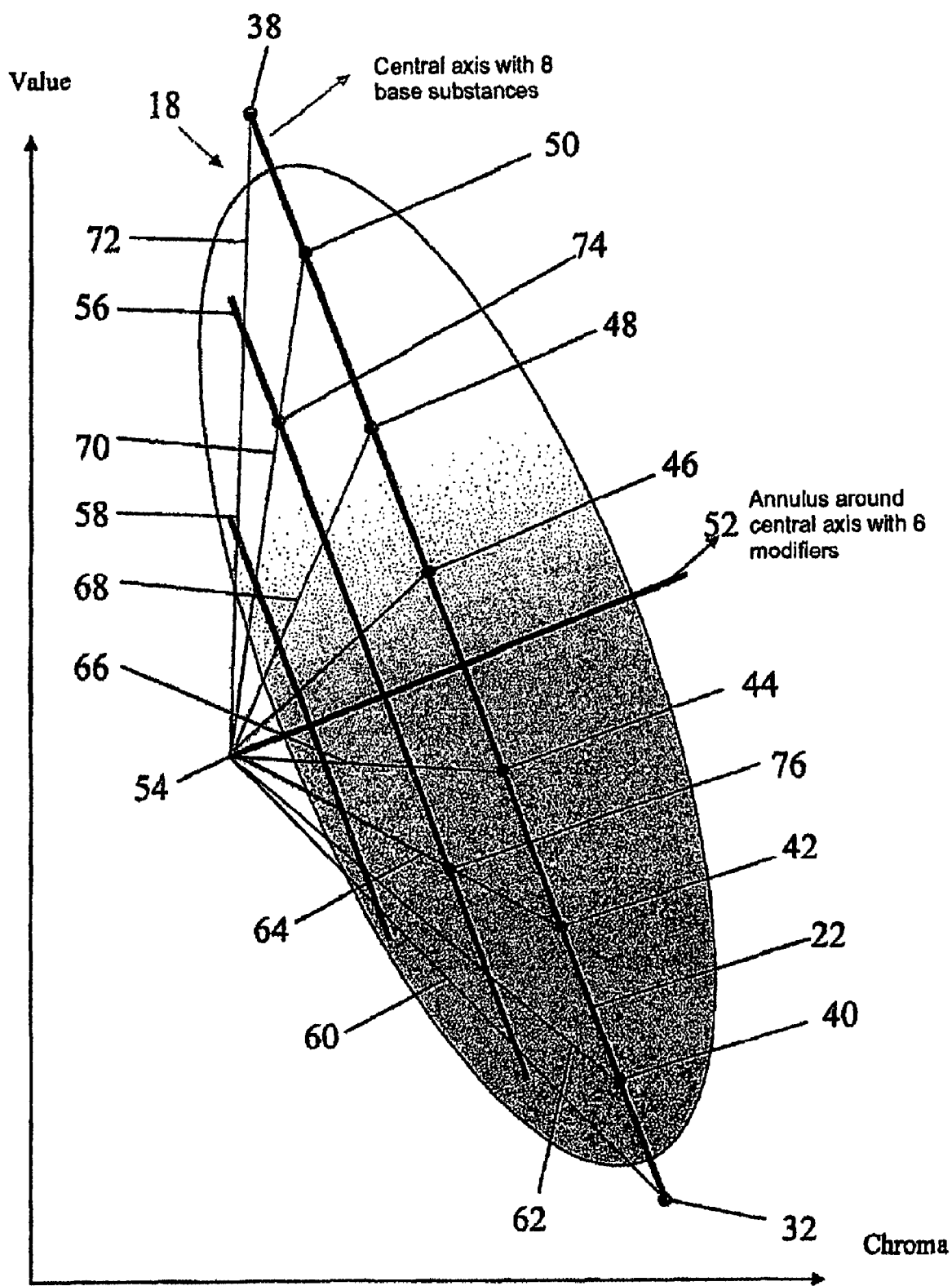
FIG. 3 shows a further longitudinal section of the space representing the natural teeth in the CIElab color space.
Figure 6:
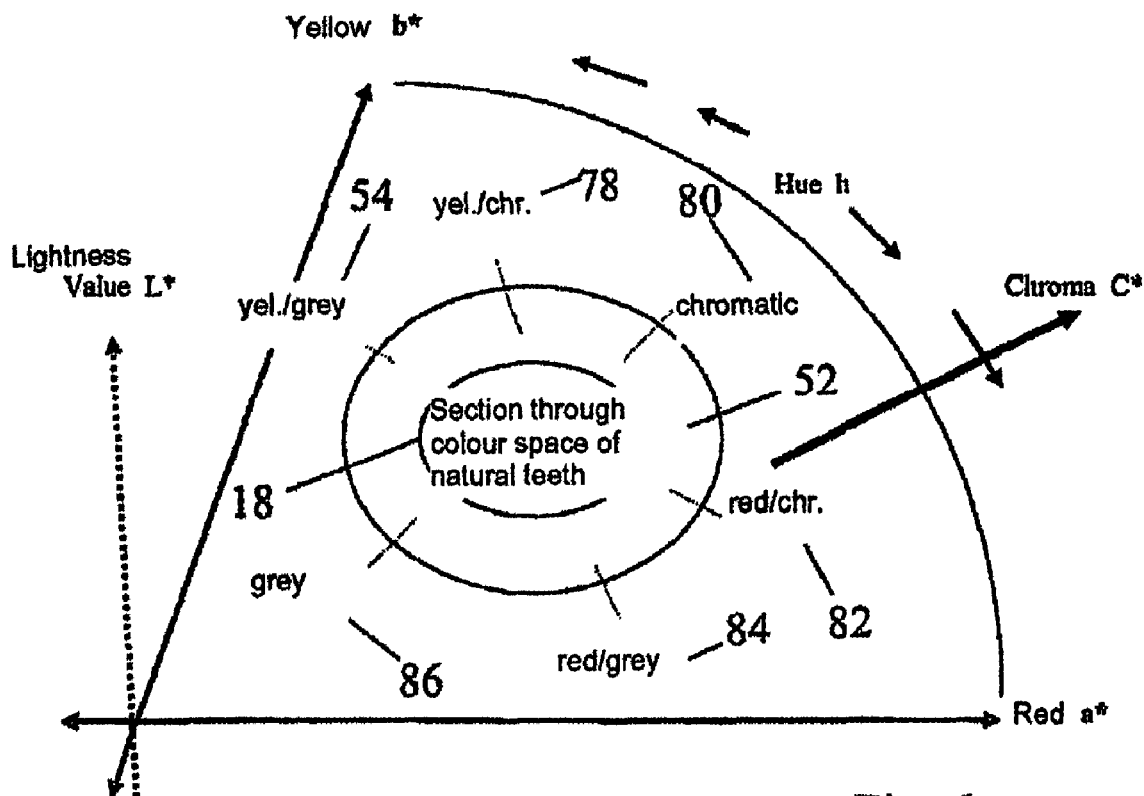
FIG. 6 shows a schematic diagram of the positions of mixed colors in the CIElab color space.

The space 18, which represents the natural tooth colors, and which is shown in sections in FIGS. 2, 3, and 6, possesses a longitudinal or center axis 22, which extends obliquely relative to the L* axis.

The colors that have been acquired by means of the measuring instrument 10 and have been specified in CIElab coordinates are now compared to the colors stored in the computer 16, in order to subsequently provide information 24 about first and second primary colors—to be referred as modifier substances 28 and base substances 26 respectively—to be mixed to produce a mixed color 30, which most closely resembles the color of the remaining teeth 12.

For the purpose of keeping the number of mixed colors relatively small, without a deviation of the dental prosthesis color from the color of the remaining teeth becoming noticeable, one provides a dental color system of the type described in the following.

In accordance with the sectional views of the color space 18 in FIGS. 2 and 3, first primary colors 32, 38, 40, 42, 44, 46, 48, 50 are marked out on the color space's longitudinal axis 22, which extends from light to dark, or on a base line also extending from light to dark. In this, following the illustrations of FIGS. 2 and 3, one primary color—primary color 38 in the present embodiment example—should be situated beyond the lightest possible color, and one second primary color—primary color 32 in the embodiment example—should be located beyond the darkest possible tooth color, in order to optimize the number and position of the colors to be mixed. Further, FIG. 3 illustrates that the distance between the coordinates of the first primary colors 32, 38, 40, 42, 44, 46, 48, 50 is constant.

Also defined are second primary colors 54, which constitute the modifier substances 28. In the embodiment example of FIG. 3, these are located in a plane 52, which is intersected centrically and perpendicularly by the center axis 22. The second primary colors 54 are situated on the plane 52, outside of the space 18, in particular uniformly distributed around the space 18, whereby the distance between the second primary color 54 and the envelope of the space 18 is constant. Put another way, the second primary colors 54 are positioned on a circle, provided that the intersection line between the plane 52 and the envelope of the space 18 is also a circle. If the line is in the shape of an ellipse, the second primary colors 54 will be positioned on an ellipse also.

To produce mixed colors out of the first and second primary colors 32, 38, 40, 42, 44, 46, 48, 50, or 54, i.e. the base substances 26 and the modifier substances 28, following the illustration of FIG. 3, two first straight lines 56, 58 are positioned in the space 18 parallel to the longitudinal axis 22 in a way so that they will be intersected by the connecting lines between the first primary colors or base colors 32, 38, 40, 42, 44, 46, 48, 50 and the second base color or modifier color 54. These connections are referred to as second straight lines 60, 62, 64, 66, 68, 70, and 72. The intersection point of the first and second straight lines 56, 58, and 60, 62, 64, 66, 68, 70, 72, respectively, then provides the coordinates of the mixed colors. The corresponding intersection points are referenced by the labels 74, 76 as an example. Each of the second base colors is assigned at least one straight line in the space 18. If a second base color is associated with several first straight lines, then these preferably always will subdivide the second straight lines with the same proportions. The first straight line or lines associated with a second base color, in the present embodiment example intersect the plane 52 at a connecting line between the second base color 54 and the longitudinal axis 22.

The first straight lines 56, 58 should perpendicularly intersect the plane 52 at points that subdivide the second straight lines 60, 62, 64, 66, 68, 70, 72 with a predetermined, preferably even-numbered ratio. In the present case, the second straight lines 60, 62, 64, 66, 68, 70, 72 are subdivided by the first straight line 56 with a 1:2 ratio and by the second straight line 58 with a 2:1 ratio. This provides a simple capability for mixing the first and second primary colors to produce mixed colors.

FIG. 4 shows a sectional view of the space 18 along the plane 52. It is evident that at equal distance to the intersection of the plane 52 with the envelope of the space 18, i.e. the annulus 73, are located the second base or primary colors 54, 78, 80, 82, 84, 86. Thus, the second base colors 54, 78, 80, 82, 84, and 86 are also located on a circle 75. The mixed colors resulting from the intersection of the first and second straight lines 56, 58, 60, 62, 64, 66, 68, 70, 72 are located on a plane that is parallel to plane 52, in particular on the circumferential surfaces of cylinders, which are surrounded circumferentially by the circles 74 and 76 and are defined by the first straight lines.

The embodiment example provides a total of six second base colors 54, 78, 80, 82, 84, 86, with colors that are given as an example in FIG. 6.

The number of second base colors 54, 78, 80, 82, 84, 86 corresponds to the respective number of first straight lines 56, 92, 94, 96, 98, 100 or 58, 102, 104, 106, 108, 110 extending on the circumferential surface of a cylinder. In the embodiment example, the intersection lines of the plane 52 with the cylinders defined by the respective first straight lines 56, 92, 94, 96, 98, 100, and 58, 102, 104, 106, 108, 110 are assigned the labels 89 and 88, respectively. The longitudinal axes of the cylinders coincide with the longitudinal axis 22. Incorporating the assumption in FIGS. 3 and 4 regarding the number of first primary colors 40, 42, 44, 46, 48, 50 positioned within the space 18, the number of second base colors 54, 78 80, 82, 84, 86, as well as the number of first straight lines 56, 92, 94, 96, 98, 100, and 58, 102, 104, 106, 108, 110, the intersection points between the first and second straight lines yield the following number of dental prosthesis colors, which are distributed evenly through the space 18:

2(first straight lines)×8(second base colors)×6(first base colors within the space)+6(first base colors within the space)=102.

The first base colors 40, 42, 44, 46, 48, 50 positioned within the space 18 must be added to the number of mixed colors within the space 18, since they can also be used as colors for a dental prosthesis.

Since the mixed colors are distributed uniformly through the space 18, it is unproblematic to find a color—and thus the mixing ratio of first and second primary color—, which resembles the color of the remaining set of teeth 12. The computer determines the CIElab space coordinates of the color 12 of the remaining set of teeth that was acquired with the measuring instrument 10. Subsequently one determines the coordinates of a mixed color or a first primary color that is closest to the determined color of the remaining set of teeth 12. This mixed color then is made available as data 24, so that the mixed color 30 can be produced using the specified proportions of first and second primary color, i.e. base substance and modifier substance. If the coordinates closest to those of the measured color of the remaining teeth 12 are those of a first base color, it is not necessary to utilize a second base color.

Even though it was explained with the help of FIG. 3 that the space 18 representing the natural tooth colors is intersected by a single plane, in particular plane 52, this does not apply restrictively. In accordance with the illustration of FIG. 2, two planes 107, 109, intersected perpendicularly by the longitudinal axis 22, can be defined, which again contain defined second primary colors 111, 112, preferably outside the space 18. In every plane 107, 109, the second primary colors 111, 112 again exhibit an equal distance to the intersection line between the plane 107 or 108 and the envelope of the space 18. On condition that the intersection line is a circle, the second primary colors 111, 112 are evenly distributed along a circle in the plane 107, 109, whereby the circle's center is intersected by the longitudinal axis 22.

Preferably, six second primary colors 111, 112 are specified per plane. It is also possible for more than two parallel planes to pass through the space 18. Moreover, the second base colors must not necessarily be situated outside the space 18.

In the embodiment of FIG. 2—on condition that six first primary colors 34, 36 are located inside the space 18 on the longitudinal axis 22 and that only one respective first straight line 114 extends between each second base color 111, 112 and the longitudinal axis 22, which extends parallel to the longitudinal axis 22, one obtains the following number of colors:

8(second primary colors of the first plane 107)×1 (number of first straight lines)×6(number of first primary colors inside the space)+8(second primary colors of the second plane 109)×1(number of first straight lines)×6(number of first primary colors inside the space)+6(number of first primary colors situated on the longitudinal axis inside the space)=102.

Figure 7:
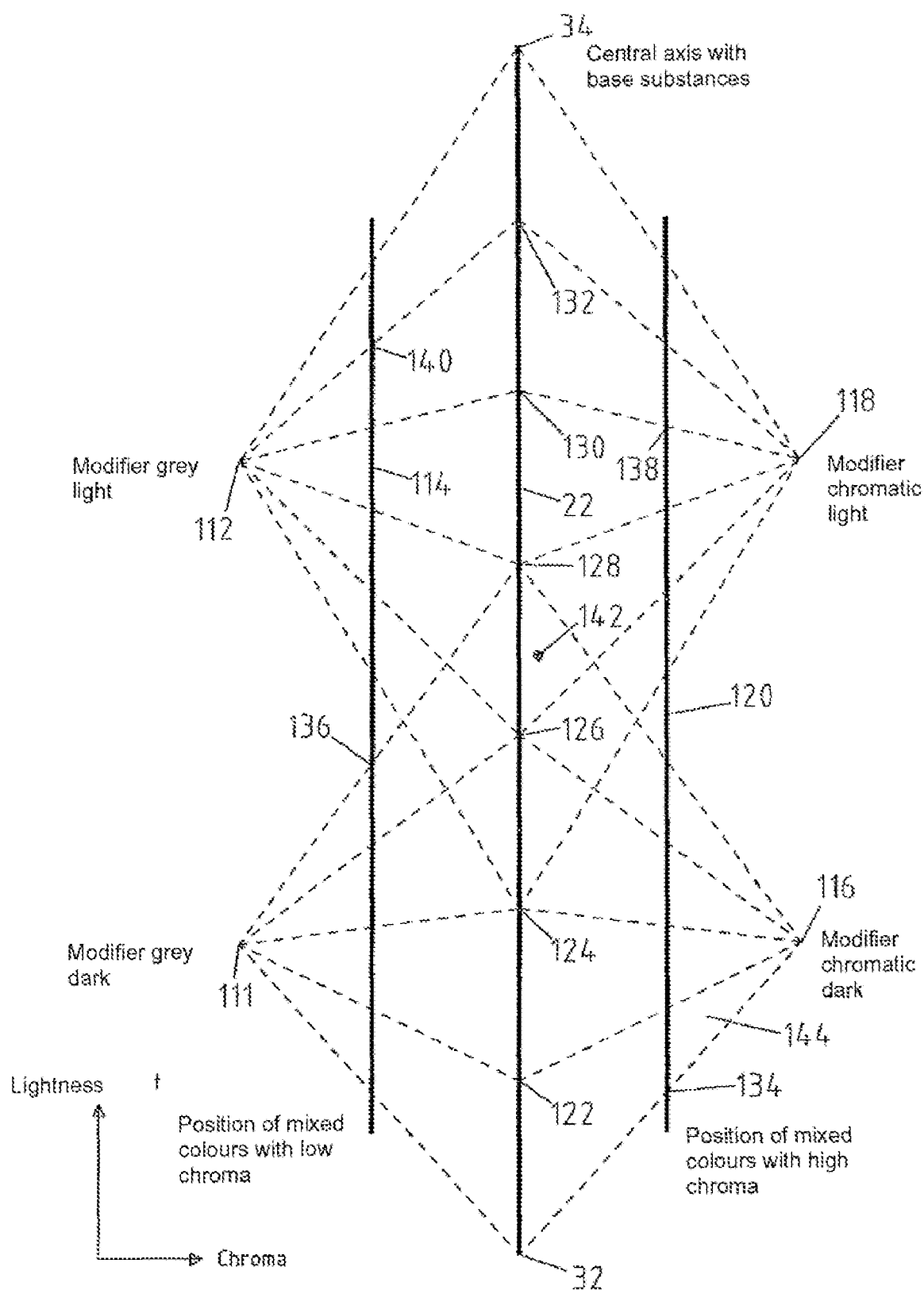
FIG. 7 shows a schematic diagram regarding the determination of mixed colors.

FIG. 7 schematically illustrates again the determination of the mixed colors and the use of first and second primary colors allowing for the assumptions of FIG. 2, i.e. that second primary colors 111, 112 or modifier substances are located in different lightness planes 107, 109. It is also apparent how mixed colors are determined that are located at low or high chroma. For this, FIG. 7 uses labels corresponding to those of FIG. 2. In the sectional view, the second primary colors positioned at high chroma are labeled 116, 118 and a further first straight line is labeled 120. The first primary colors located inside the space 18 are labeled 122, 124, 126, 128, 130, and 132. It is evident that the first primary colors 32, 122, 124, 126, 128, 130, 132, 34 are equidistant to each other. Subsequently, the mixed colors are pinpointed via the second straight lines—formed by the connecting lines between the second primary colors 111, 112 or 116, 118 and the first primary colors 32, 122, 124, 126, 128, 130, 132, 34- and their intersection points with the first straight lines 114, 120. As an example, some of the mixed colors are labeled, in particular with reference labels 134, 136, 138, 140.

The determination of a dental prosthesis color will be explained with the help of FIG. 7. If the handheld spectrophotometer 10 determines the color of the remaining set of teeth 12 as the point 142 in the CIElab color space 18, the color chosen for the dental prosthesis would be the one that corresponds to the CIElab coordinates of the first base color 126. If the color of the remaining set of teeth 12 corresponds to point 144 in CIElab coordinates, a mixed color is chosen, which corresponds to the CIElab coordinates at point 134. Consequently, a base substance with CIElab coordinates 32 and a modifier substance with the CIElab coordinates of point 116 are mixed with a 1:1 ratio to produce the color for the dental prosthesis.

The invention provides for the necessary extent of mixing of first and/or second primary colors, which have assigned coordinates in the CIElab space, which can be located in different planes, i.e. planes of different lightness, through which the L axis or a base line passes perpendicularly. The primary colors themselves do not have to be located within the ellipsoid-shaped space of the CIElab space, which essentially contains the coordinates of the colors of natural teeth. On the other hand, the mixed colors to be produced from the first and second primary colors are located within the ellipsoid-shaped space or on its surface.

What is claimed is:

1. A dental color system comprising primary colors and mixed colors, which are assigned coordinates in a CIElab color space, where the colors of natural teeth are situated on coordinates within an ellipsoid-shaped space, which has an assigned longitudinal,
wherein the primary colors consist essentially of first primary colors and at least one group of second primary colors, the coordinates of the first primary colors being located on a longitudinal axis of the ellipsoid-shaped space or on a base line extending from light to dark in the CIElab space, the coordinates of at least one said group of second primary colors are located on a plane that perpendicularly intersects the longitudinal axis or base line, and the coordinates of the mixed colors are intersection points of first and second straight lines, whereby at least one straight line extends in parallel to the longitudinal axis or base line and a respective second straight line connects the coordinates of one of the first primary colors and one of the second primary colors.

2. The dental color system of claim 1, wherein the coordinates of at least one group of second primary colors are situated outside the ellipsoid-shaped space.

3. The dental color system of claim 1, wherein the coordinates of the second primary colors are situated in at least two planes, which are spaced apart from each other and perpendicularly intersect the longitudinal axis or base line.

4. The dental color system of claim 1, wherein the second primary colors that are located on a common plane are positioned on a circle or ellipse, which has the longitudinal axis or base line as a center thereof.

5. The dental color system of claim 1, wherein the second primary colors that are located on a common plane are positioned on a line, which at a constant distance surrounds an intersecting line between the plane and an envelope of the ellipsoid-shaped space.

6. The dental color system of claim 1, wherein one second straight line intersects at least two first straight lines.

7. The dental color system of claim 6, wherein the two first straight lines subdivide the one second straight line between the coordinates of the first and the second primary colors in equal proportions.

8. The dental color system of claim 1, wherein every second straight line is subdivided by one respective first straight line between the coordinates of the first and the second primary colors in equal proportions.

9. The dental color system of claim 1, wherein the at least one first straight line subdivides the second straight line between the coordinates of the first and the second primary colors with a ratio 1:n, where n=1, 2, or 3.

10. The dental color system of claim 6, wherein the at least two first straight lines subdivide the second straight line between the coordinates of the first and the second primary colors with a ratio 1:n, where n=2 or 3.

11. The dental color system of claim 1, wherein at least x first primary colors are provided, where x>4.

12. The dental color system of claim 11, wherein x>8.

13. The dental color system of claim 1, wherein consecutive first primary colors are separated by a distance on the longitudinal axis or base line which is equal or approximately equal.

14. The dental color system of claim 1, wherein a lightest and/or darkest first primary color is situated outside of the ellipsoid-shaped space representing the standard natural tooth color.

15. The dental color system of claim 1, wherein y second primary colors are provided, where y>4.

16. The dental color system of claim 15, wherein $y \geq 6$.

17. The dental color system of claim 4, wherein consecutive second primary colors are separated by a distance positioned on a plane on the circle or the ellipse which is equal.

18. A method for producing dental prosthesis colors for a dental prosthesis surrounded by a remaining set of teeth, using primary and/or mixed colors with coordinates in a CIElab color space, in which the tooth colors of natural teeth are essentially located on coordinates of an ellipsoid-shaped space, which is assigned a longitudinal axis or a base line extending from light to dark through the CIElab colors space, whereby the color of the remaining set of teeth is determined in coordinates of the CIElab color space, comprising the steps of:

acquiring the color of the remaining set of teeth with a measuring instrument, defining first primary colors with coordinates on the longitudinal axis or the base line of the ellipsoid-shaped space, defining second primary colors with coordinates on at least one plane that perpendicularly intersects the longitudinal axis or the base line, defining mixed colors with coordinates located on intersection points between first straight lines extending parallel to the longitudinal axis or base line and connecting straight lines between the first and second primary colors, and selecting the coordinates of a mixed or primary color that are closest to those of the color of the remaining set of teeth as the color of the dental prosthesis.

19. The method of claim 18, wherein the second primary colors are defined so that their coordinates are outside of the ellipsoid-shaped space.

20. The method of claim 18, wherein mixed colors are determined with coordinates in at least two planes which are parallel to each other and perpendicularly intersect the longitudinal axis or base line.

21. The method of claim 18, wherein the measuring instrument sends data corresponding to the CIElab coordinates of the color of the remaining set of teeth to a computer, wherein data corresponding to the CIElab coordinates of the primary and mixed colors is stored in the computer and is compared to the data for the color of the remaining set of teeth, and wherein on the basis of the comparison, information data is generated which pertain to the mixing ratio of one first and one second primary color, or to the use of one primary color as the dental prosthesis color.

* * * * *